(12) United States Patent
Alvarez et al.

(10) Patent No.: US 12,345,727 B2
(45) Date of Patent: Jul. 1, 2025

(54) DIAGNOSTIC LABORATORY DISTRIBUTION SYSTEM

(71) Applicant: Roche Diagnostics Operations, Inc., Indianapolis, IN (US)

(72) Inventors: Mauro Alvarez, Rubi (ES); Jordi Sans Pena, Rubi (ES)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 143 days.

(21) Appl. No.: 17/452,781

(22) Filed: Oct. 29, 2021

(65) Prior Publication Data
US 2022/0178957 A1    Jun. 9, 2022

(30) Foreign Application Priority Data

Dec. 3, 2020 (EP) .................................... 20383055

(51) Int. Cl.
*G01N 35/04* (2006.01)
*G01N 35/00* (2006.01)

(52) U.S. Cl.
CPC ......... *G01N 35/04* (2013.01); *G01N 2035/00306* (2013.01); *G01N 2035/00455* (2013.01); *G01N 2035/0405* (2013.01)

(58) Field of Classification Search
CPC ......... G01N 35/04; G01N 2035/00306; G01N 2035/00455; G01N 2035/0405;
(Continued)

(56) References Cited

U.S. PATENT DOCUMENTS 3,582,144 A * 6/1971 Woolard ................. B65G 51/03
                                                                   406/88
5,526,705 A * 6/1996 Skotnikov ............... G01N 33/24
                                                                   73/866
(Continued)

FOREIGN PATENT DOCUMENTS

| CN | 211323029 U | 8/2020 |
|---|---|---|
| EP | 3095739 A1 | 11/2016 |
| JP | H01-148966 A | 6/1989 |
| JP | H02-157017 A | 6/1990 |

(Continued)

OTHER PUBLICATIONS

ORA Laboratory Manual vol. II, Food and Drug Administration Office of Regulatory Affairs, ORA-LAB.5.3, May 15, 2019 (Year: 2019).*

(Continued)

*Primary Examiner* — Benjamin R Whatley
*Assistant Examiner* — Curtis A Thompson
(74) *Attorney, Agent, or Firm* — Woodard, Emhardt, Henry, Reeves & Wagner, LLP

(57) ABSTRACT

A diagnostic laboratory distribution system, wherein the distribution system comprises a number of carriers adapted to carry one or more goods. The distribution system comprises a transport plane adapted to support the carriers and a drive device, wherein the drive device is adapted to move the carriers on the transport plane, and a control device to control the drive device. The distribution system comprises a cover for the transport plane, and humidity sensors connected to the control device and airflow generating devices connected to the control device. The airflow generating devices are distributed over the distribution system to generate an airflow between the cover and the transport plane. The control device is configured to start the airflow generating devices if the humidity sensors measure a humidity above a predefined threshold value.

19 Claims, 3 Drawing Sheets

(58) Field of Classification Search
CPC .......... G01N 2035/00277; G01N 2035/00346; G01N 35/00; G01N 35/1067; G01N 35/02; G01N 35/10; B01L 1/025
See application file for complete search history.

(56) References Cited

U.S. PATENT DOCUMENTS

| | | | |
|---|---|---|---|
| 5,844,138 | A | 12/1998 | Cota |
| 2009/0090022 | A1* | 4/2009 | Ho .......................... F26B 11/12 34/406 |
| 2013/0034410 | A1* | 2/2013 | Heise ..................... G01N 35/04 414/222.13 |
| 2014/0231217 | A1* | 8/2014 | Denninger ....... G01N 35/00584 198/619 |
| 2017/0059599 | A1* | 3/2017 | Riether ................ G01N 35/026 |
| 2017/0209860 | A1 | 7/2017 | Daniels et al. |
| 2018/0202908 | A1 | 7/2018 | Croquette et al. |
| 2018/0210001 | A1* | 7/2018 | Reza ...................... G01N 35/10 |
| 2020/0191808 | A1 | 6/2020 | Cook et al. |
| 2022/0060856 | A1* | 2/2022 | Wellig .................. G16H 50/70 |

FOREIGN PATENT DOCUMENTS

| | | |
|---|---|---|
| JP | 2016-176902 A | 10/2016 |
| WO | 2001/051929 A1 | 7/2001 |
| WO | 2012/158541 A1 | 11/2012 |

OTHER PUBLICATIONS

Anemostat, Laminar flow applications, critical environment, https://web.archive.org/web/20170830013244/http://www.anemostat-hvac.com/literature/laminar_flow_app.pdf (Year: 2017).*

Ashrae, HVAC Design Manual for Hospitals and Clinics, retrieved Apr. 5, 2020, Chapter 9, "Health Care Facilities", https://web.archive.org/web/20200405160346/https://www.ashrae.org/file%20library/technical%20resources/covid-19/i-p_a19_ch09_health_care_facilities.pdf (Year: 2020).*

Anemostat, Critical Environment, Multi-Vent—MV1 Single Chamber Laminar Flow Panels, retrieved Dec. 4, 2017, https://web.archive.org/web/20171204131059/https://www.anemostat-hvac.com/Critical_Environment/Multi-Vent_MV1.asp (Year: 2017).*

European Search Report issued Apr. 6, 2021, in Application No. 20383055.8, 2 pp.

* cited by examiner

DIAGNOSTIC LABORATORY DISTRIBUTION SYSTEM

CROSS-REFERENCE TO RELATED APPLICATIONS

This application claims priority to European Patent Application No. 20383055.9, filed 3 Dec. 2020, the disclosure of which is hereby incorporated by reference in its entirety.

TECHNICAL FIELD

Embodiments of the present disclosure refer to a diagnostic laboratory distribution system.

BACKGROUND

Diagnostic laboratory distribution systems are described in, e.g., EP 3 095 739 A1 or WO 2012/158541 A1. These publications describe laboratory sample distribution systems with passive carriers or self-propelling carriers on transport planes.

In the following, a distribution system is any kind of probe transportation in a diagnostics laboratory within and in-between any analyzers, pre-analytic systems, post-analytic systems, storage devices, etc.

SUMMARY

In view of the above background, a diagnostic laboratory distribution system and a method for a diagnostic laboratory distribution are herein introduced. Although the embodiments of the present disclosure are not limited to specific advantages or functionality, it is noted that in accordance with the present disclosure, a diagnostic laboratory distribution system is provided that is more reliable and safer.

In accordance with one embodiment of the instant disclosure, a diagnostic laboratory distribution system is provided, wherein the distribution system comprises: a number of carriers wherein the carriers are adapted to carry one or more goods, a transport plane wherein the transport plane is adapted to support the carriers, a drive device, wherein the drive device is adapted to move the carriers on the transport plane, and a control device to control the drive device, wherein the distribution system comprises a cover for the transport plane, wherein the distribution system comprises humidity sensors to measure humidity above the transport plane connected to the control device and airflow generating devices connected to the control device, wherein the airflow generating devices are distributed over the distribution system to generate an airflow between the cover and the transport plane, and wherein the control device is configured to start the airflow generating devices if the humidity sensors measure a humidity above a predefined threshold value.

In accordance with another embodiment of the instant disclosure, a method for a diagnostic laboratory distribution system is provided wherein the distribution system comprises a number of carriers adapted to carry one or more goods, a transport plane adapted to support the carriers, a drive device adapted to move the carriers on the transport plane, and a control device to control the drive device, wherein the distribution system comprises a cover for the transport plane, wherein the distribution system comprises humidity sensors connected to the control device and airflow generating devices connected to the control device, wherein the airflow generating devices are distributed over the distribution system to generate an airflow between the cover and the transport plane, and wherein the control device starts the airflow generating devices if the humidity sensors measure a humidity above a predefined threshold value.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where the structure is indicated with like reference numbers and in which.

Figure 1:
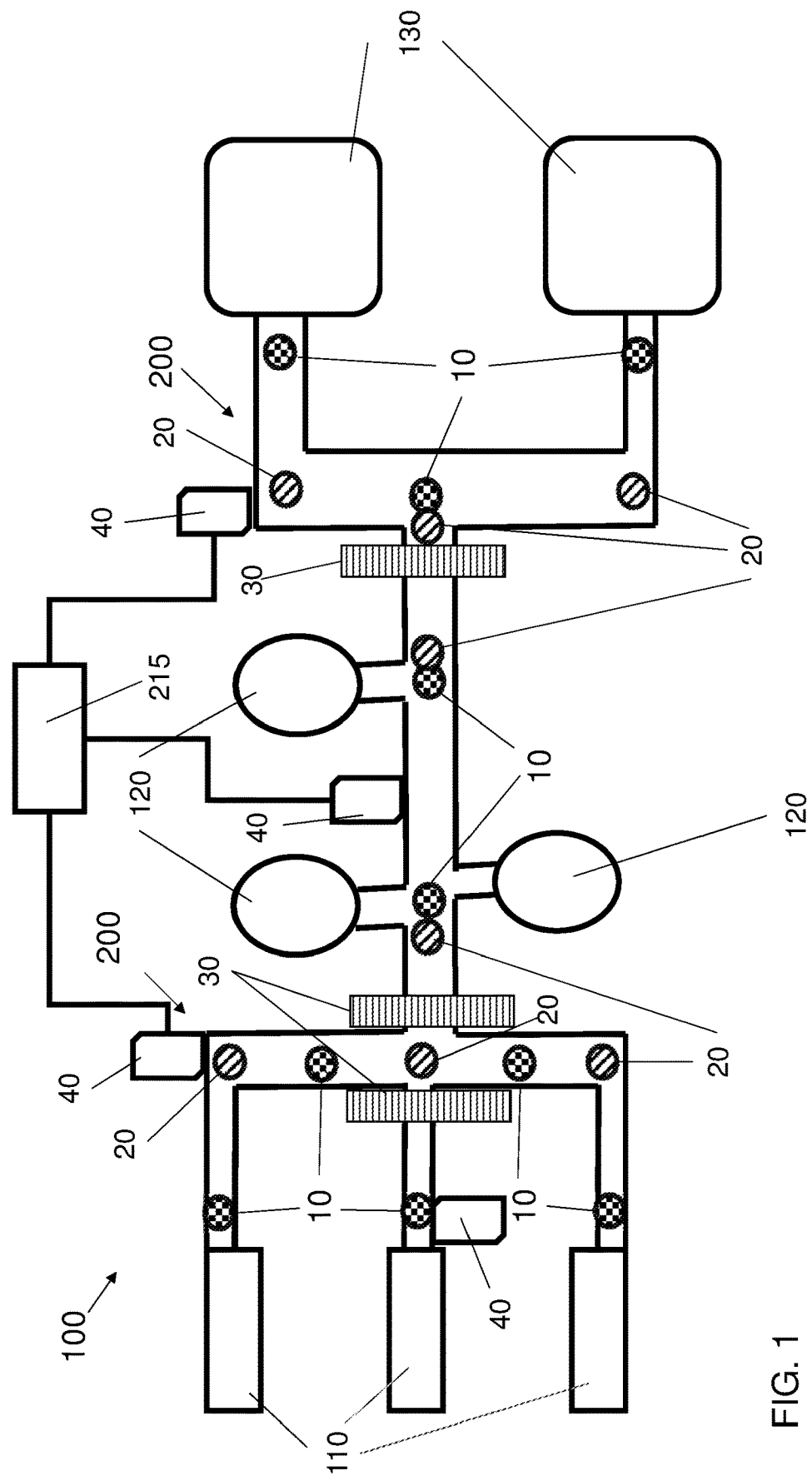
FIG. 1 shows a schematic overview of a diagnostics laboratory with a diagnostic laboratory distribution system in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

Further optional features and embodiments of the present disclosure will be disclosed in more detail in the subsequent description of typical embodiments, typically in conjunction with the dependent claims. Therein, the respective optional features may be realized in an isolated fashion as well as in any arbitrary feasible combination, as the skilled person will realize. The scope of the present disclosure is not restricted by the typical embodiments. The embodiments are schematically depicted in the figures. Therein, identical reference numbers in these figures refer to identical or functionally comparable elements.

DETAILED DESCRIPTION

A first aspect of the present disclosure concerns a diagnostic laboratory distribution system, wherein the distribution system comprises a number of carriers wherein the carriers are adapted to carry one or more goods. Goods can be anything to be distributed in a diagnostics laboratory, e.g., sample tubes, reagent containers, pipetting tips, other consumable material, quality control samples, waste in any form, etc.

A transport plane of the distribution system is adapted to support the carriers.

A drive device of the distribution system is adapted to move the carriers on the transport plane. The drive device can be realized, e.g., as magnetic coils underneath the transport plane in connection with a magnetic device in the carriers, or as electrical motors in the carriers themselves connected to wheels of the carriers.

A control device of the distribution system controls the drive device. The control device can be realized as a central or distributed computing device connected to the drivers of the coils underneath the transport plane or as a distributed control device in the carrier to control the electrical motor of the carrier.

The distribution system comprises a cover for the transport plane. Furthermore, the distribution system comprises humidity sensors connected to the control device and an airflow generating device connected to the control device. The humidity sensors measure the humidity of the air between the cover and the transport plane.

The airflow generating devices are distributed over the distribution system to generate an airflow between the cover and the transport plane, wherein the control device is configured to start the airflow generating devices if the humidity sensors measure a humidity above a predefined threshold value.

Airflow generating devices can be one single device or multiple devices depending on the geometry of the transport plane layout. For instance, a single straight forward pathway only need one airflow generating devices, wherein a complex design with multiple crossings and branchings needs more than one airflow generating device.

In a further embodiment, the predefined humidity threshold depends on the goods to be transported.

In another embodiment, thresholds are used well below the dew-point in the range of 60%-90% relative humidity, in particular 70%-80% or 75% relative humidity.

Another aspect of the present disclosure is a distribution system wherein the control device is configured to stop the airflow generating devices, if the humidity sensors measure a humidity value below the predefined threshold.

A further aspect of the disclosed distribution system is that the airflow generating devices generate a laminar airflow.

A laminar flow means that the air particles follow smooth paths in layers.

In a further embodiment, the humidity sensors are distributed over the distribution system to control humidity above the transport plane. The distribution is such that in all areas the humidity of the air is measured.

In still another embodiment, the humidity sensors work continuously. In a further embodiment, the humidity sensors are adapted to measure the humidity if a carrier is in the sensor range of the respective humidity sensor.

Another aspect of the present disclosure is a distribution system wherein the transport plane of the distribution system is arranged in lanes and crossings, wherein the cover of the distribution system comprises negative pressure escape apertures, wherein the negative pressure escape apertures are placed surrounding or at the crossings, so that the laminar airflow is maintained at the crossings.

In accordance with another embodiment of the instant disclosure, the negative pressure escape apertures are placed in pairs at opposite sides of the crossings.

A further aspect of the disclosed distribution system is that the cover comprises heating elements to heat the cover, wherein the control device is connected to the heating elements, and wherein the control device is configured to start and stop the heating elements depending on a predefined second threshold of the signals of the humidity sensors.

In a further embodiment, the predefined second threshold of the signals of the humidity sensors are used below the dew-point in the range of 70%-99% relative humidity, in particular 80%-90% or 95% relative humidity. In another embodiment, the predefined second threshold is higher than the predefined threshold measured in relative humidity.

Sensors to measure relative humidity are well known in the art and, e.g., described in U.S. Pat. No. 5,844,138, the disclosure of which is hereby incorporated herein by reference.

Another aspect of the present disclosure is a distribution system, wherein the distribution system comprises microbiological sensors, which are arranged between the transport plane and the cover and are connected to the control device, and wherein the control device is configured to start the airflow generating devices if the control device receives from the microbiological sensor a signal above a predefined biological threshold.

A further aspect of the disclosed distribution system is that the control device is configured to stop the airflow generating devices if the signals of the microbiological sensor are below the predefined biological threshold.

The threshold value depends on the sensor used. Examples of microbiological sensors include real time bio aerosol sensors, such as those described in US 2017/0209860 A1, the disclosure of which is hereby incorporated herein by reference.

Another aspect of the present disclosure is a distribution system, wherein the distribution system comprises a uv-light generating device.

In other embodiments of the present disclosure, the uv-light generating devices can be realized as one or more of light bulbs, LEDs, lasers, LED-lasers, and the like. UV-light can be, in particular, a wavelength between 100 nm and 400 nm, or between 200 nm and 300 nm.

In accordance with a further aspect of the present disclosure, the distribution system includes control devices that are connected to the uv-light generating device and starts the uv-light generating device when the signal of the microbiological sensors is above a second predefined biological threshold and, in particular, stops the uv-light generating devices if the signal of the microbiological sensors is below the second biological threshold.

In a further embodiment, the second predefined biological threshold is higher than the predefined biological sensor, meaning that with increasing contamination first the airflow generating devices are started, and if the contamination still increases, the uv-light generating devices are switched on.

In a further embodiment, the microbiological sensor measures the opacity of a nutrient rich detection site and the signal is higher the more opaque the nutrient rich detection site is and/or the faster the opacity increases.

In accordance with another aspect of the present disclosure, a method for a distribution system is provided wherein the distribution system comprises a number of carriers, wherein the carriers are adapted to carry one or more goods, a transport plane wherein the transport plane is adapted to support the carriers, a drive device, wherein the drive device is adapted to move the carriers on the transport plane, and a control device to control the drive device, wherein the distribution system comprises a cover for the transport plane, wherein the distribution system comprises humidity sensors connected to the control device and an airflow generating devices connected to the control device, wherein the airflow generating devices are distributed over the distribution system to generate an airflow between the cover and the transport plane, and wherein the control device starts the airflow generating devices if the humidity sensors measure a humidity above a predefined threshold value.

In particular, the method for a distribution system is a method to analyze the air in the distribution system and to keep the air safe in the distribution system. More in particular, the method allows reducing cross contamination between substance transported by the distribution system.

In accordance with a further aspect of the disclosure, the method for a distribution system is that the distribution system comprise microbiological sensors, wherein the control device starts the airflow generating devices if the microbiological sensor connected to the control device sends a signal above a microbiological threshold and stops the airflow generating devices if the signal is below the microbiological threshold.

Another aspect of the present disclosure is a method for a distribution system, wherein the distribution system comprise a uv-light generating devices connected to the control device, wherein the control device starts the uv-light generating devices if the microbiological sensor connected to the control device sends a signal above a second microbiological threshold and stops the uv-light generating devices if the signal is below the second microbiological threshold.

In accordance with another aspect of the present disclosure, the control device activates the drive device so that all carriers are moved out of an area of the transport plane for which the signal of the microbiological sensor is above the second microbiological threshold before the uv-light generating devices are switched on.

Another aspect of the present disclosure is a method for a distribution system, wherein a start signal has always-higher priority than any stop signal of the airflow generating devices.

However, other embodiments are feasible which relate to a combination of features disclosed herewith. In order that the embodiments of the present disclosure may be more readily understood, reference is made to the following examples, which are intended to illustrate the disclosure, but not limit the scope thereof.

FIG. 1 shows a schematic of a top view of a diagnostic laboratory distribution system 100.

Pre-analytic systems 110 are able to receive goods by an operator. In diagnostic labs these are usually tubes filled with a body fluid of a patient. These tubes are sorted, centrifuged, and the quality of the body fluid is checked. The pre-analytic systems hand-over the goods 230 into the carriers 240.

The carriers 240 transports the goods/tubes 230 on the transport plane 200 to analyzers 120. In the analyzers 120, some part of the body fluid is sucked out of the tubes to be analyzed. After the required measurements are done, the tubes 230 are transported by the carriers 240 on the transport plane 200 to the post-analytic stations 130.

These post-analytic stations 130 have a sorting device to put the tubes 230 into carriers, which are then transported into a refrigerated container. If a further measurement is required for a particular tube design the post-analytic station 130 can retrieve the tube and put it again into a carrier 240, so that the tube can be transported again to an analyzer 120, which makes the required measurement.

A transport system with transport plane 200 connects the pre-analytic systems 110, the analyzers 120, and the post-analytic stations 130, so that the carriers 240 can be transported moving on the transport plane 200.

Figure 2:
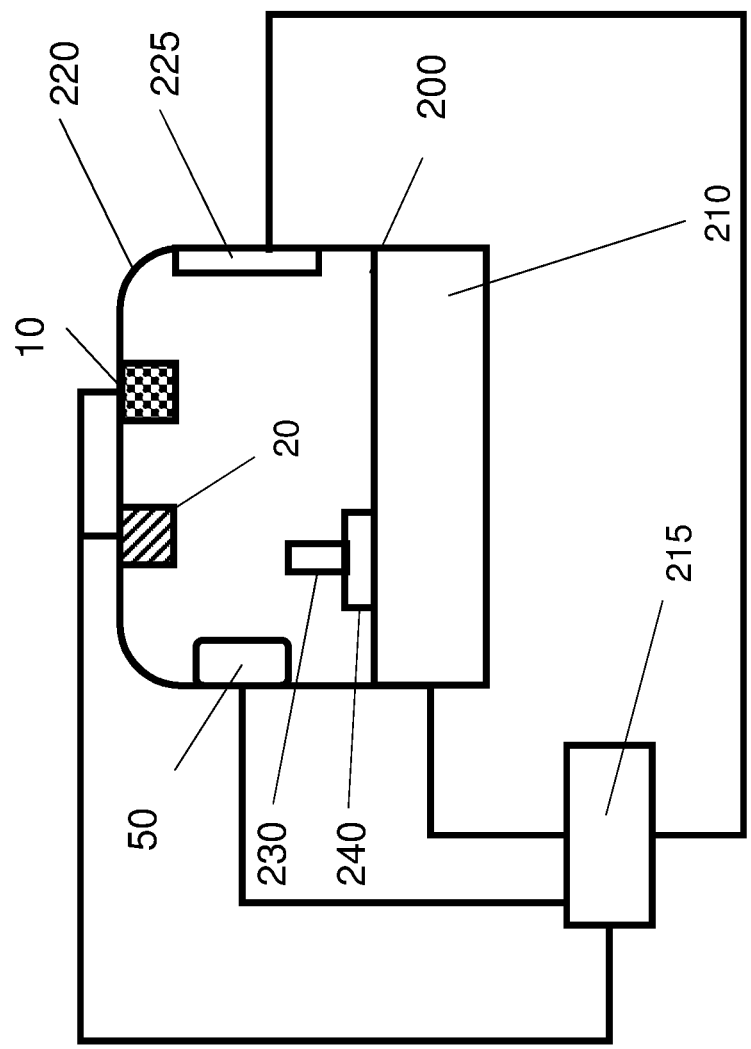
FIG. 2 shows a schematic cross section of a transport device of a diagnostic laboratory distribution system in accordance with an embodiment of the present disclosure.

Humidity sensors 10 and microbiological sensors 20 are distributed over the transport system. One possibility to fix these sensors is shown in FIG. 2. The humidity sensors 10 and microbiological sensors 20 are fixed at a cover 220 over the transport plane 200. The sensors are place in a tube like space bordered by the transport plane 200 and cover 220.

Examples of microbiological sensors are real time bio aerosol sensors such as described in US 2017/0209860 A1. Sensors to measure relative humidity are well known in the art and, e.g., described in U.S. Pat. No. 5,844,138. Also, combinations of microbiological sensors with relative humidity sensors are known, so that the microbiological sensor 20 and the humidity sensor 10 can be realized in one device.

In FIG. 1, the control device 215 is shown only with its connection to the airflow generating devices 40. Other connections to the transport system, the sensors 10,20 and optionally also the pre-analytic systems 110, the analyzers 120, and the post-analytic devices 130, are omitted to keep an overview. These connections can be realized by an industry-bus standard cable based or with wireless communication. All the connections shown in FIG. 2 are also present for the embodiment shown in FIG. 1 for each respective device.

As can be seen in FIG. 1, four airflow generating devices 40 are placed so that a laminar airflow can be generated. For small branches of the transport system connected to the pre-analytic systems 110 or post analytic devices 130, no particular airflow generating devices 40 are installed.

At the main junctions of the transport plane 200, a negative pressure escape aperture 30 is installed in the cover 220. This allows generating a laminar airflow by one airflow generating device 40 in the region where the analyzers are connected to the transport plane 200.

A laminar airflow will minimize the risk of cross contamination between tubes 230 transported by the carriers 240 on the transport plane 200. Usually open tubes 230 are transported in such a diagnostic laboratory distribution system 100.

At the left junction in FIG. 1, two negative pressure escape apertures are placed opposite each other to keep the airflow laminar. An additional airflow generating device 40 may be needed for the branch to the respective pre-analytic system 110. This additional airflow generating device 40 is connected to the control device 215 via a wireless communication.

In FIG. 2, additionally a uv-generating device 50 is shown. This is placed at the side of the cover 220. In a further embodiment, the uv-generating devices 50 are placed always with a microbiological sensor 20.

In addition, FIG. 2 shows a heating element 225 connected to the cover 220 to heat the cover 220. The heating element 225 can be realized as a discrete heating element at distinct positions at the cover 220 or as a distributed heating element.

In accordance with another embodiment not shown in the figures, a distributed heating element can be realized with heating wires included in the cover material over the whole length of the cover 220.

The heating element 225 can be used to heat the cover so that condensation of any liquid is prohibited at the cover 220. This avoid droplets that can contaminate the filling of the tubes 230 transported over the transport plane 200.

Figure 3:
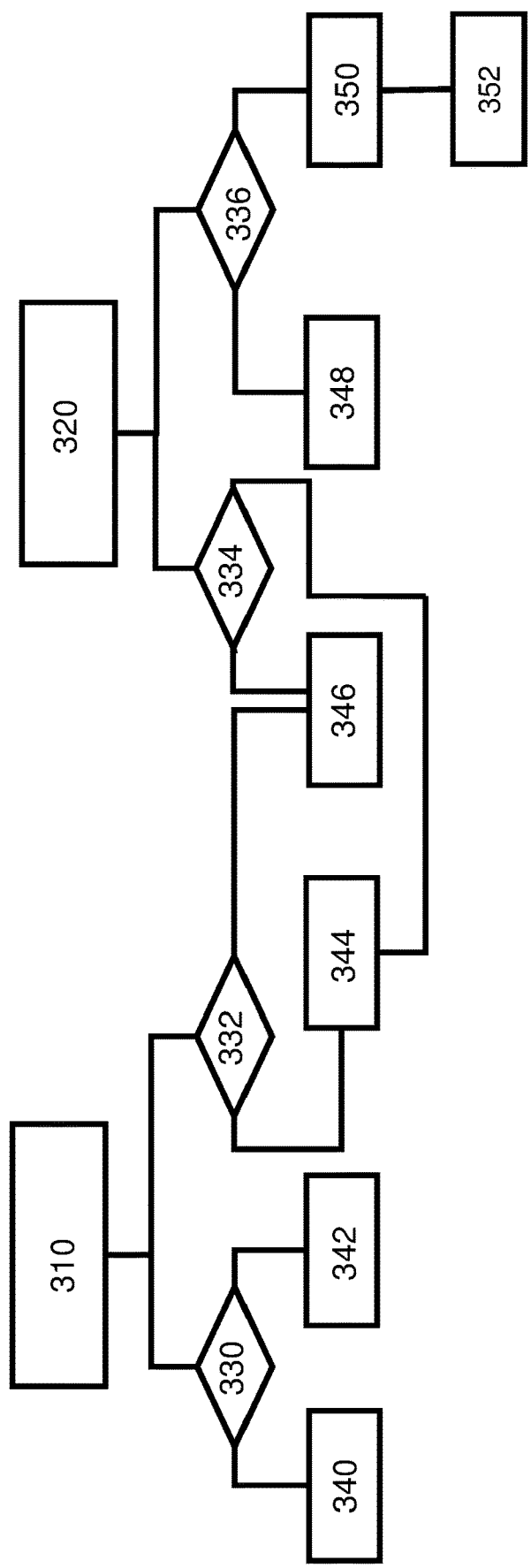
FIG. 3 shows one embodiment of the method for a distribution system in accordance with an embodiment of the present disclosure.

FIG. 3 shows one embodiment of the method for a distribution system. In step 310, the humidity of the air in the distribution system is controlled.

In another typical embodiment of the instant disclosure, the air is confined between a transport plane 200 and a cover 220 building some kind of tube.

The signal of the humidity sensor 10 is sent to the control device 215. The control device 215 decides in step 332 whether the signal of the humidity sensor corresponding to the relative humidity of the air in the tube like air volume is above or below a predefined threshold.

If the value is above the predefined threshold, the control device 215 will send in step 334 to the airflow generating devices 40 a signal to start the airflow, and if the signal is below the threshold the control device 215 will send in step 346 a stop signal to the airflow generating devices and the airflow will be stopped.

The control device 215 further decides in step 330 if the signal of the humidity sensor 40 measured in step 310 is above a second predefined value. If the signal is above the second predefined value the control device 215 will start in step 340 the heating element 225 of the cover 220. If the signal is below the second predefined value the control device 215 will send in step 342 a stop signal to the heating element 225.

In step 320, the microbiological sensor 20 measures the microbiological contamination of the air in the tube like air volume between the transport plane 200 and the cover 220. In step 334, the control device 215 decides if the value of the microbiological sensor 20 is above or below a predefined microbiological threshold. If the value is above the predefined microbiological threshold the control device will send in step 344 a start signal to the airflow generating devices 40. If the value is below the predefined microbiological threshold, the control device 215 will send in step 346 a stop signal to airflow generating device 40.

The airflow generating device 40 will give to a start signal a higher priority than to any stop signal. For instance, if the airflow generating device gets at the same time a start signal of step 344 and a stop signal from step 346 due to different outcomes of the values of the humidity sensor 10 in step 310, and the microbiological sensor in step 320, the airflow generating device 40 will start to generate the airflow.

In step 336, the control device 215 decides if the value of the microbiological sensor 20 measured in step 320 is above or below a second predefined microbiological threshold.

If the value is below the second predefined microbiological threshold the control device will sent in step 248 a stop signal to the uv-light generating devices 50. If the value is above the predefined second microbiological threshold the control device 215 sends in step 350 a signal to the drive device 210 to remove all goods 230 from the transport plane. If all goods are removed, the control device 215 sends in step 352 a start signal to the uv-light generating device 50. The control device 215 gets feedback from the transport plane and the drive device so that the control device knows the position of all goods on the transport plane.

In a further embodiment, the distribution system 100 is divided into separate portions so that in each portion the air in the tube like air volume is controlled independently for each portion by the control device 215. In particular, borders of the portions of the distribution system 100 are defined by the negative pressure escape apertures 30.

This allows to separately use the above described methods to control the air contamination in each portion of the distribution system 100.

What is claimed is:

1. A diagnostic laboratory distribution system, wherein the distribution system comprises:
    a number of carriers wherein the carriers are adapted to carry one or more good;
    a horizontal transport plane arranged in coplanar lanes and crossings, wherein the transport plane is adapted to support the carriers;
    a pre-analytic system, an analyzer, and a post-analytic system;
    a drive device, wherein the drive device is adapted to move the carriers on the transport plane from the pre-analytic system to the analyzer and the post-analytic system,
    a control device to control the drive device;
    a cover for the transport plane, the cover and the transport plane forming a tube like air volume, the carriers being transported over the transport plane in the tube like air volume between the transport plane and the cover;
    humidity sensors configured to measure humidity in the tube like air volume between the transport plane and the cover, the humidity sensors being connected to the control device; and
    one or more airflow generating devices connected to the control device,
        wherein the one or more airflow generating devices generate a laminar airflow in the tube like air volume between the cover and the transport plane,
        wherein the control device is configured to start the one or more airflow generating devices when the humidity sensors measure a humidity above a predefined threshold value, and
        wherein the cover of the distribution system comprises negative pressure escape apertures placed at the crossings.

2. The distribution system according to claim 1, wherein the control device is configured to stop the airflow generating devices when the humidity sensors measure a humidity value below the predefined threshold.

3. The distribution system according to claim 1, wherein the system comprises heating elements to heat the tube like air volume between the transport plane and the cover, wherein the control device is connected to the heating elements, and wherein the control device is configured to start and stop the heating elements depending on a predefined second threshold of signals of the humidity sensors.

4. The distribution system according to claim 1, wherein the distribution system comprises microbiological sensors, which are arranged in the tube like air volume between the transport plane and the cover and are connected to the control device, and wherein the control device is configured to start the airflow generating devices if the control device receives from the microbiological sensors a signal above a first biological threshold.

5. The distribution system according to claim 4, wherein the control device is configured to stop the airflow generating devices if a signal of the microbiological sensors is below a second biological threshold.

6. The distribution system according to claim 1, wherein the distribution system comprises a uv-light generating device.

7. The distribution system according to claim 4, wherein the control device is connected to a uv-light generating device and starts the uv-light generating device when a signal of a microbiological sensor of the microbiological sensors is above a second biological threshold.

8. The distribution system according to claim 7, wherein the control device stops the uv-light generating device if a signal of the microbiological sensors is below the second biological threshold.

9. The distribution system according to claim 1, wherein the negative pressure escape apertures are placed in pairs at opposite sides of the crossings.

10. The distribution system according to claim 1, wherein the negative pressure escape apertures are placed in the cover above the crossings.

11. The distribution system according to claim 10 wherein the negative pressure escape apertures are also placed in the cover above the lanes.

12. The distribution system according to claim 1 wherein the control device is configured to detect the humidity above the predefined threshold value, and in response the control device starts the airflow generating devices.

13. The distribution system according to claim 1 wherein the control device is configured to detect the humidity above the predefined threshold value and to start the airflow generating devices.

14. The distribution system according to claim 1 wherein the control device starts the airflow generating devices upon detecting the humidity above the predefined threshold value.

15. A method for controlling a diagnostic laboratory distribution system, wherein the distribution system comprises:
- a number of carriers adapted to carry one or more goods,
- a horizontal transport plane adapted to support the carriers,
- a pre-analytic system, an analyzer, and a post-analytic system;
- a drive device adapted to move the carriers on the transport plane, from the pre-analytic system to the analyzer and to the post-analytic system;
- a control device to control the drive device, a cover for the transport plane, the cover and the transport plane forming a tube like air volume, the carriers being transported over the transport plane in the tube like air volume between the transport plane and the cover,
- humidity sensors configured to measure humidity between the transport plane and the cover, the humidity sensors being connected to the control device, and
- airflow generating devices connected to the control device,
  - wherein the airflow generating devices are distributed over the distribution system and generate a laminar airflow in the tube like air volume between the cover and the transport plane,
  - wherein the control device starts the airflow generating devices when if the humidity sensors measure a humidity above a predefined threshold value, and
  - wherein the horizontal transport plane is arranged in coplanar lanes and crossings, wherein the cover of the distribution system comprises negative pressure escape apertures, and wherein the negative pressure escape apertures are placed at the crossings.

16. The method for controlling a diagnostic laboratory distribution system according to claim 15, wherein the distribution system comprising microbiological sensors in the tube like air volume, the control device starting the airflow generating devices when if a microbiological sensor of the microbiological sensors sends to the control device a signal above a predefined microbiological threshold, and stops the airflow generating devices if the signal is below the predefined microbiological threshold.

17. The method for controlling a diagnostic laboratory distribution system according to claim 16, wherein the distribution system comprising uv-light generating devices in the transport space the control device starting the uv-light generating devices if a microbiological sensor of the microbiological sensors sends to the control device a signal above a second predefined microbiological threshold and stops the uv-light generating devices if the signal is below the second predefined microbiological threshold.

18. The method for controlling a diagnostic laboratory distribution system according to claim 17, wherein the control device activates the drive device so that all carriers are moved out of an area of the transport plane for which the signal of the microbiological sensor is above the second predefined microbiological threshold before the uv-light generating devices are switched on.

19. The method for controlling a diagnostic laboratory distribution system according to claim 18, wherein a start signal has always higher priority than any stop signal of the airflow generating devices.

* * * * *